(12) United States Patent
Yang et al.

(10) Patent No.: US 9,182,784 B2
(45) Date of Patent: Nov. 10, 2015

(54) DOUBLE-SIDED EMISSION TYPE DISPLAY DEVICE

(71) Applicant: SAMSUNG DISPLAY CO., LTD., Yongin, Gyeonggi-Do (KR)

(72) Inventors: Hyo-Sang Yang, Yongin (KR); Jin-Oh Park, Yongin (KR); Dong-Wan Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 176 days.

(21) Appl. No.: 13/944,865

(22) Filed: Jul. 17, 2013

(65) Prior Publication Data

US 2014/0139992 A1 May 22, 2014

(30) Foreign Application Priority Data

Nov. 20, 2012 (KR) .................. 10-2012-0131946

(51) Int. Cl.
*H05K 1/11* (2006.01)
*H05K 1/14* (2006.01)
*G06F 1/16* (2006.01)

(52) U.S. Cl.
CPC ............ *G06F 1/1601* (2013.01); *G06F 1/1637* (2013.01)

(58) Field of Classification Search
USPC ............................................. 361/784, 679.21
See application file for complete search history.

(56) References Cited

U.S. PATENT DOCUMENTS

| | | | |
|---|---|---|---|
| 2007/0109465 | A1 | 5/2007 | Jung et al. |
| 2009/0278452 | A1 | 11/2009 | Kim |
| 2012/0105339 | A1 | 5/2012 | Jung |

FOREIGN PATENT DOCUMENTS

| | | |
|---|---|---|
| KR | 10-2007-0051500 | 5/2007 |
| KR | 10-2008-0059856 | 7/2008 |
| KR | 10-2009-0116101 | 11/2009 |
| KR | 10-2012-0045291 | 5/2012 |

*Primary Examiner* — Andargie M Aychillhum
(74) *Attorney, Agent, or Firm* — Christie, Parker & Hale, LLP (57) ABSTRACT

A double-sided emission type display device includes a first substrate having a first connection and a first protruded portion extending in a first direction; a first display unit at the first substrate; a second substrate coupled to the first substrate, comprising a second connection and a second protruded portion extending in the first direction; a second display unit at the second substrate; and a first flexible printed circuit board (FPCB) including a first connecting portion coupled to the first connection and a second connecting portion coupled to the second connection.

21 Claims, 6 Drawing Sheets

DOUBLE-SIDED EMISSION TYPE DISPLAY DEVICE

CROSS-REFERENCE TO RELATED PATENT APPLICATION

This application claims priority under 35 U.S.C. §119 to and the benefit of Korean Patent Application No. 10-2012-0131946, filed on Nov. 20, 2012, in the Korean Intellectual Property Office, the disclosure of which is incorporated herein in its entirety by reference.

BACKGROUND

1. Field

The present invention relates to a double-sided emission type display device.

2. Description of the Related Art

Flat panel display devices are being used as display devices instead of cathode-ray tube display devices due to their properties such as light weight and thin profile. Representative examples of such flat panel display devices include a liquid crystal display (LCD) device and an organic light-emitting diode (OLED) display device. The OLED display device has advantages that it has excellent brightness and viewing angle properties, compared to the LCD device, and it may be implemented as a super-thin type of display device because it does not require a backlight.

The OLED display device is a display device that forms excitons through the recombining of holes and electrons, respectively, injected through a cathode and an anode on an organic thin film and uses a phenomenon in which light with a specific wavelength is generated by energy from the formed excitons.

The OLED display device is classified into a passive matrix type and an active matrix type according to a driving type, wherein the active matrix type of display device has a circuit that uses a thin film transistor (TFT). The passive matrix type of display device has an advantage of being easier to manufacture because a display area primarily includes a matrix of crossing cathodes and anodes to form pixels. The use of passive matrix display devices, however, tends to be limited to low-resolution images and small-sized displays, and passive matrix displays typically require a higher driving voltage, and have a lower material life. The active matrix type of display device may have a more stable brightness, because each pixel of the display area has a TFT and constant current is supplied to each pixel. In addition, the active matrix type of display device typically has a lower power consumption than the passive matrix type of display device, which is an important factor for implementing high-resolution and large displays.

An OLED display device may display images on both sides. In double-sided emission type OLED display devices, a backside emission type of organic light-emitting elements may be located in each of a first substrate and a second substrate, and the first and second substrates may be arranged to face each other. In this case, TFTs for controlling the driving of the organic light-emitting elements are located on the substrates in which the organic light-emitting elements are located. The backside emission type means that light from an organic light-emitting layer is emitted to the outside through a TFT.

SUMMARY

Exemplary embodiments according to the present invention provide a double-sided emission type display device in which the reliability of the display device is enhanced because a first substrate and a second substrate that are arranged to face each other are electrically coupled by a flexible printed circuit board without a bent portion.

According to an aspect of the present invention, there is provided a double-sided emission type display device that includes a first substrate having a first connection and including a first protruded portion extending in a first direction, a first display unit at the first substrate, a second substrate coupled to the first substrate, having a second connection, and including a second protruded portion extending in the first direction, a second display unit at the second substrate, and a first flexible printed circuit board including a first connecting portion coupled to the first connection and a second connecting portion coupled to the second connection.

The first display unit may be at a side of the first substrate facing the second substrate and the second display unit may be at a side of the second substrate facing the first substrate.

A first image may be reproduced at the first substrate by light emitted from the first display unit and a second image may be reproduced at the second substrate by light emitted from the second display unit.

The first substrate and the second substrate may be transparent.

The device may further include a driving integrated circuit and a second flexible printed circuit board configured to drive the driving integrated circuit, the first display unit, or the second display unit.

The driving integrated circuit and the second flexible printed circuit board may both be arranged at the first substrate or the second substrate.

The first protruded portion and the second protruded portion may not overlap each other in a second direction perpendicular to a plane of the second substrate.

The first connection may be at a side of the first protruded portion facing the second substrate and the second connection may be at a side of the second protruded portion facing the first substrate.

The first connecting portion may be at a first side of the first flexible printed circuit board and the second connecting portion may be at a second side of the first flexible printed circuit board opposite the first side.

The first flexible printed circuit board may be in a space between the first substrate and the second substrate.

The first flexible printed circuit board and the second flexible printed circuit board may be of a film type.

The first display unit and second display unit may each include an organic light-emitting element.

According to another aspect of the present invention, there is provided a double-sided emission type display device that includes a first substrate having a first connection, a first display unit at the first substrate, a second substrate coupled to the first substrate and having a second connection, a second display unit at the second substrate, a first driving integrated circuit at the first substrate, a second driving integrated circuit at the second substrate, and a third flexible printed circuit board configured to drive the first driving integrated circuit, the second driving integrated circuit, the first display unit, or the second display unit, wherein the third flexible printed circuit board includes a first connecting portion at one side of the third flexible printed circuit board and is coupled to the first connection and a second connecting portion at the other side of the third flexible printed circuit board and is coupled to the second connection.

The first display unit may be at a side of the first substrate facing the second substrate, and the second display unit may be at a side of the second substrate facing the first substrate.

A first image may be reproduced at the first substrate by light emitted from the first display unit and a second image may be reproduced at the second substrate by light emitted from the second display unit.

The first substrate and the second substrate may be transparent.

The first substrate may include a first protruded portion at one side of the first substrate and extending in a first direction, and the second substrate may include a second protruded portion at one side of the second substrate and extending in the first direction, wherein the first and second protruded portions do not to overlap each other in a second direction perpendicular to a plane of the second substrate.

The first connection may be at a side of the first protruded portion facing the second substrate and the second connection may be at a side of the second protruded portion facing the first substrate.

The first driving integrated circuit may be at the side of the first protruded portion facing the second substrate, and the second driving integrated circuit may be at the side of the second protruded portion facing the first substrate.

The third flexible printed circuit board may be a film type.

The first display unit and the second display unit may each include an organic light-emitting element.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION

As used herein, the term "and/or" includes any and all combinations of one or more of the associated listed items. Expressions such as "at least one of," when preceding a list of elements, modify the entire list of elements and do not modify the individual elements of the list.

The present invention may make various changes and have several embodiments; therefore, specific embodiments will be illustrated on the drawings and described in the detailed description in detail. However, this is not intended to limit the present invention to specific embodiments but should be understood as including all changes, equivalents, and replacements that fall within the spirit and technical scope of the present invention. Detailed descriptions related to well-known technologies will be ruled out in order not to unnecessarily obscure subject matter of the present invention.

Though terms like a first and a second may be used to describe various components, the components should not be limited to these terms. The terms are used only for the purpose of distinguishing one component from another component.

The terms used herein are used to describe specific embodiments and are not intended to limit the present invention.

The terms of a singular form may include plural forms unless being used as explicitly different meaning on the context. It should be understood that terms like "comprises", "includes", or "has" is herein intended to designate that there is a feature, a numeral, a step, an operation, a component, a part or their combination described in the specification and do not exclude one or more other features, numerals, steps, operations, components, parts or their combinations.

Exemplary embodiments of the present invention will be described in more detail below with reference to the accompanying drawings.

Figure 1:
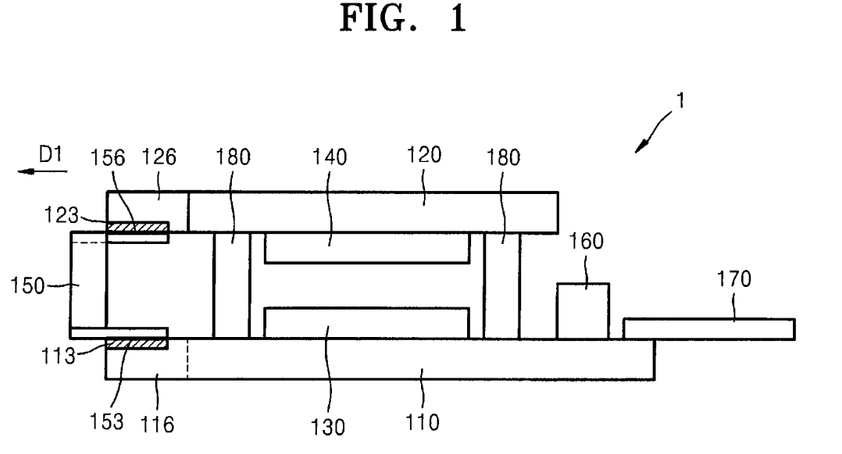
FIG. 1 is a schematic side view of a double-sided emission type display device according to an embodiment of the present invention.
Figure 2:
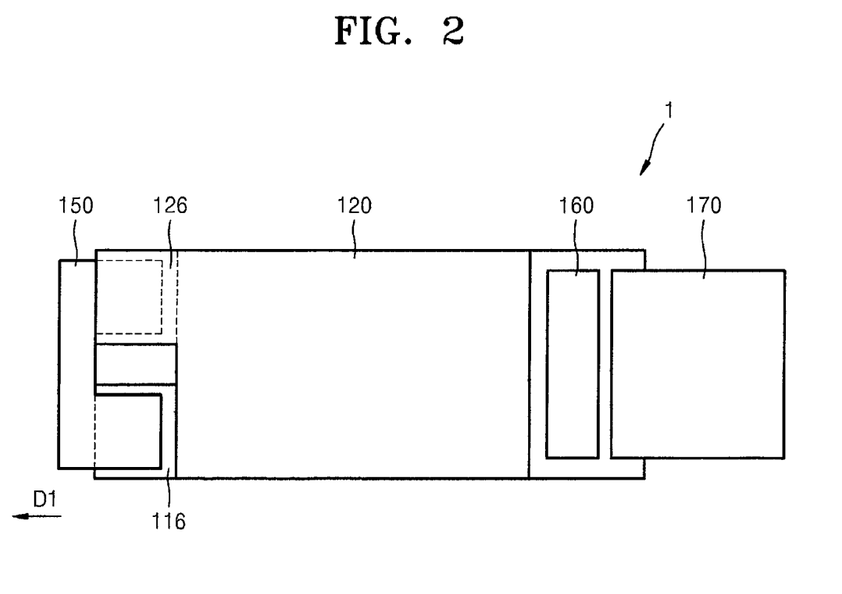
FIG. 2 is a schematic plan view of the double-sided emission type display device of FIG. 1.
Figure 3:
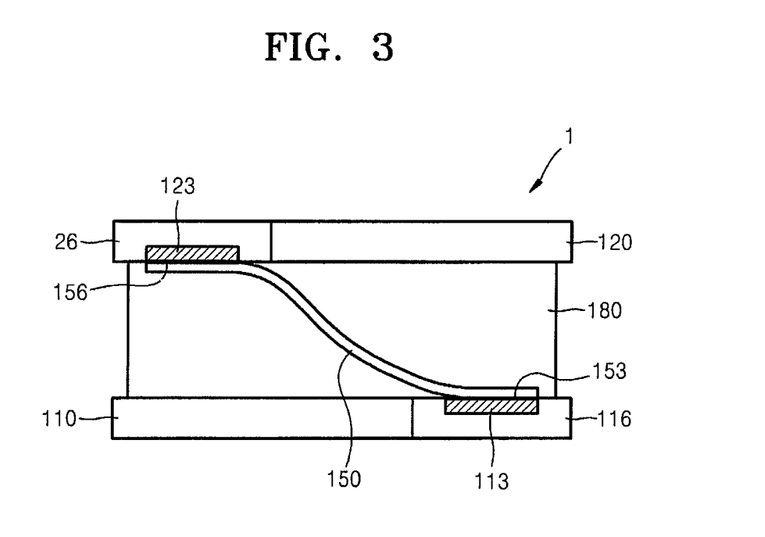
FIG. 3 is a schematic side view of the double-sided emission type display device of FIG. 1.

FIG. 1 is a schematic cross-sectional view of a double-sided emission type display device 1 according to an embodiment of the present invention, FIG. 2 is a plan view schematically illustrating the double-sided emission type display device 1 of FIG. 1, and FIG. 3 is a schematic cross-sectional view of the double-sided emission type display device 1 of FIG. 1.

Referring to FIGS. 1 to 3, the double-sided emission type display device 1 may include a first substrate 110, a first display unit 130, a second substrate 120, a second display unit 140, a first flexible printed circuit board (FPCB) 150, a driving integrated circuit 160, a second FPCB 170, and a sealant 180.

The first substrate 110 and the second substrate 120 may each include a silicon dioxide ($SiO_2$) based transparent glass substrate but are not necessarily limited thereto. In addition, the first substrate 110 and the second substrate 120 may be coupled by a sealant 180.

The first display unit 130 may be positioned at (e.g., mounted on or coupled to) one side of the first substrate 110 to reproduce images, and the second display unit 140 may be positioned at (e.g., mounted on or coupled to) one side of the second substrate 120 to reproduce images.

The first display unit 130 and the second display unit 140 may include various display devices that may reproduce images. For example, they may include an organic light-emitting display device, an inorganic light-emitting device, an LCD display device, or an electrophoretic display device.

A first protruded portion 116 may be formed at one side of the first substrate 110 and extend in a first direction D1. In addition, a second protruded portion 126 may be formed at one side of the second substrate 120 and extend in the first direction D1. The first protruded portion 116 and the second protruded portion 126 may overlap each other in a second direction perpendicular to a plane of the second substrate 120.

A first connection 113 may be located in one side of the first protruded portion 116 facing toward the second substrate 120, and a second connection 123 may be located at one side of the second protruded portion 126 facing toward the first substrate 110.

The first connection 113 and the second connection 123 may be electrically coupled to each other by the first FPCB 150. Accordingly, electrical signals required for driving the first display unit 130 and the second display unit 140 may be supplied through one driving integrated circuit 160 and one flexible printed circuit board 170. The first FPCB 150 may be a film type FPCB.

The first FPCB 150 may include a first connecting portion 153 that is electrically connected to the first connection 113 and a second connecting portion 156 that is electrically connected to the second connection 123. The first connecting portion 153 may be formed at one side of the first FPCB 150 and the second connecting portion 156 may be formed at the other side of the first FPCB 150. Accordingly, the first FPCB 150 may be electrically coupled to the first connection 113 and the second connection 123 without a bent portion.

In addition, to connect the first connection 113 to the first connecting portion 153 or connect the second connection 123 to the second connecting portion 156, heat or pressure may be applied to the connected sides (e.g., using a separate instrument or device for applying heat or pressure to the connected sides). When heat or pressure is applied, because the first protruded portion 116 and the second protruded portion 126 may not overlap each other in a direction perpendicular to a plane of the second substrate 120, the instrument or device that may apply heat or pressure may be easily located at the first protruded portion 116 or the second protruded portion 126. Thus, it is relatively easy to couple the first connection 113 to the first connecting portion 153 or and to couple the second connection 123 to the second connecting portion 156.

The driving integrated circuit 160 may be mounted at (e.g., positioned at) at least one of the first substrate 110 or the second substrate 120 in the form of an integrated circuit chip. The driving integrated circuit 160 may create scan signals and data signals in response to driving power and signals transmitted via a pad unit (not illustrated) from the outside and may supply them to scan lines and data lines, respectively. To this end, the driving integrated circuit 160 may include a scan driving unit to create scan signals and a data driving unit to create data signals.

The second FPCB 170 may be positioned at a substrate at which the driving integrated circuit 160 is positioned. The second FPCB 170 receives driving signals from an external driving circuit (not illustrated). To this end, the second FPCB 170 may have a connector (not illustrated). The connector may be integrated/fixed to another connector attached to an external driving circuit, for example, a driving circuit of a mobile phone, and may receive driving signals from the driving circuit of the mobile phone. The second FPCB 170 that receives driving signals creates various control signals in response to the driving signals it receives and correspondingly is configured to drive the first display unit 130, the second display unit 140, or the driving integrated circuit 160. The second FPCB 170 may be a film type FPCB.

Figure 4:
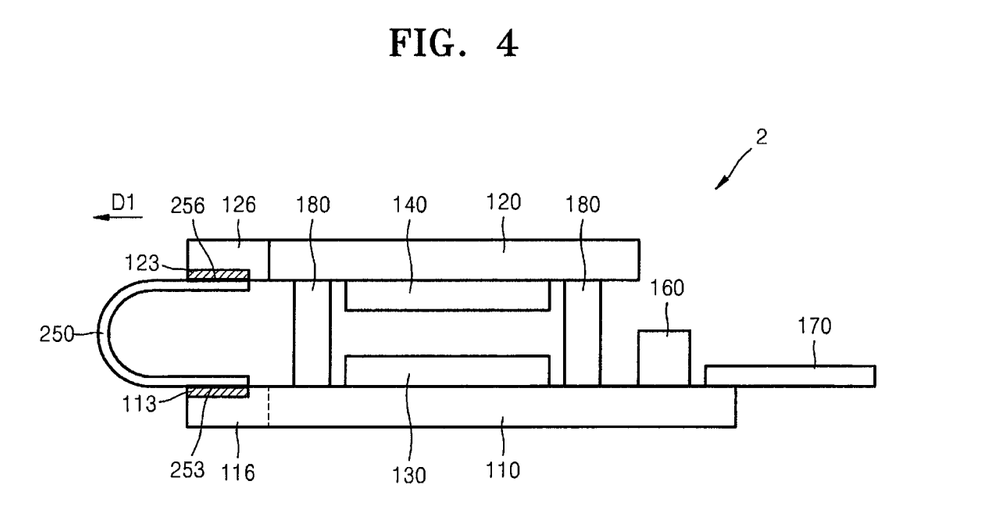
FIG. 4 is a schematic side view of a double-sided emission type display device according to a comparative example of the present invention.

FIG. 4 is a schematic cross-sectional view of a double-sided emission type display device according to a comparative example of the present invention.

Referring to FIG. 4, in the double-sided emission type display device 2 according to the comparative example, a bent portion is formed as a flexible FPCB 250. The bent portion of the flexible FPCB 250 may develop film lead cracks. In addition, a separate instrument or device that applies heat and pressure to connecting portions 253 and 256 and connections 113 and 123 may be used for attaching the flexible FPCB 250.

However, because a space in which such an instrument or device may be located is limited to one between the first substrate 110 and the second substrate 120, it is not easy to connect the connecting portions 253 and 256 to the connections 113 and 123.

However, as illustrated in FIGS. 1 to 3 according to the embodiment of the present invention described previously, the first connecting portion 153 and the second connecting portion 156 are respectively formed on different sides of the first FPCB 150, which reduces the amount of bending of FPCB 150 required to couple FPCB 150 to the first connecting portion 153 and the second connecting portion 156. As a result, the incidence of film lead cracks that develop in the first FPCB 150 is reduced or prevented, so the reliability of an instrument or device may be enhanced.

In addition, because the first protruded portion 116 and the second protruded portion 126 may not overlap in a direction perpendicular to a plane of the second substrate 120, an instrument or device that may apply heat or pressure may be easily located at the first protruded portion 116 or the second protruded portion 126. Thus, it is relatively easy to connect (e.g., attach or couple) the first connection 113 to the first connecting portion 153 and to couple (e.g., attach) the second connection 123 to the second connecting portion 156.

Figure 5:
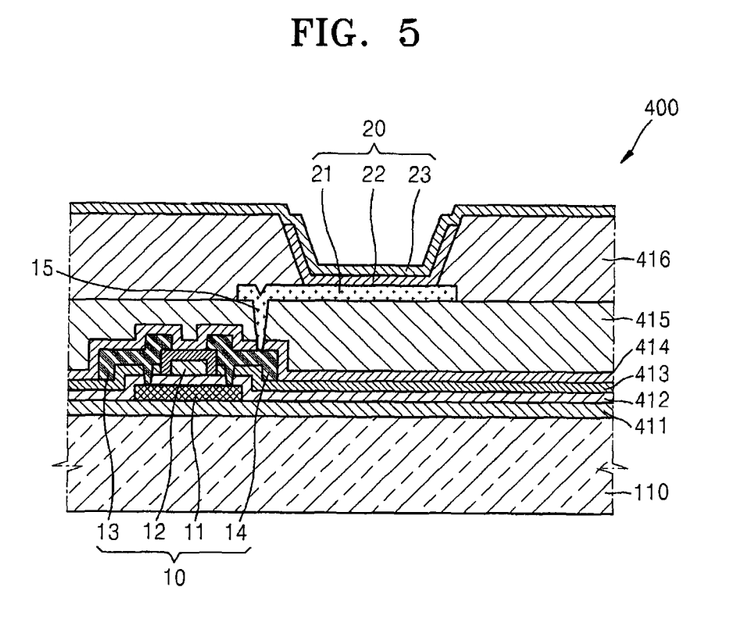
FIG. 5 is a schematic cross-sectional view of a part of a double-sided emission type display device according to another embodiment of the present invention.

FIG. 5 is a schematic cross sectional view of a part of a double-sided emission type display device 400 according to another embodiment of the present invention.

Referring to FIG. 5, the first display unit 130 of the double-sided emission type display device 400 according to the present embodiment includes an organic light-emitting element 20 at a first substrate 110. The descriptions of the first display unit 130 and the first substrate 110 described below may be equally applied to the second display unit 140 and the second substrate 120.

A thin film transistor (TFT) 10, which is located at the first substrate 110, is electrically coupled to the organic light-emitting element 20. While one light-emitting element 20 and one TFT 10 are illustrated in the figure, it is for convenience, and the part of the organic light-emitting flat display device according to the present embodiment may, of course, include a plurality of organic light-emitting elements 20 and a plurality of TFTs 10.

The organic light-emitting element 20 may be classified into a passive matrix type or an active matrix type depending on whether or not the driving of the organic light-emitting element 20 is controlled by a TFT. The organic light-emitting flat display device according to the present embodiment may be applied to any of the active matrix type and passive matrix type. The embodiments of the present invention will be described in detail below with an example of an active matrix type organic light-emitting flat display device.

A buffer layer 411 formed of $SiO_2$ and/or silicon nitride (SiNx) may be further located at the first substrate 110 to increase the smoothness of the first substrate 110 (e.g., to planarize the first substrate 110) and reduce permeation of impure elements within the first substrate 110.

An activated layer 11 of the TFT 10 that is formed of a semiconductor material is located at the buffer layer 411, and a gate insulating film 412 is located (e.g., deposited, positioned, or formed) over the activated layer 11. A gate electrode 12 is located (e.g., deposited, positioned, or formed) at the gate insulating film 412, and an inter-layer insulating film 413 is located (e.g., deposited, positioned, or formed) over the gate electrode 12. In addition, a source electrode 13 and a drain electrode 14 are located (e.g., deposited, positioned, or formed) at the inter-layer insulating film 413. Collectively, the activation layer 11, the gate electrode 12, the source electrode 13, and the drain electrode 14 constitute the TFT 10. A passivation film 414 and a planarization film 415 are sequentially formed (e.g., deposited, positioned, or located) over the inter-layer insulating film 413 and the TFT 10.

The gate insulating film 412, the inter-layer insulating film 413, the passivation film 414, and the planarization film 415 may be formed of an insulator and in a structure of single or multiple layers with inorganic, organic, or organic/inorganic compounds. The stacked structure of the TFT 10 is an example and other TFT structures of TFT may be used.

A first electrode 21 operating as an anode electrode of the organic light-emitting element 20 is located at the planarization film 415 described previously, a pixel-defining layer 416 formed of an insulator is located over the first electrode 21. After an opening (e.g., a predetermined opening) is formed in the pixel-defining film 416, the organic light-emitting layer 22 of the organic light-emitting element 20 is located in the area defined by the opening. In addition, a second electrode 23 working as a cathode electrode of the organic light-emitting element 20 is formed over the pixels (e.g., to cover all of the pixels). The polarities of the first electrode 21 and the second electrode 23 may be the opposite from each other.

A double-sided emission type display device according to the present embodiment is a backside emission type in which images are reproduced at the first substrate 110. Thus, the first electrode 21 may be transparent and the second electrode 23 may be reflective.

The first electrode 21 may be formed of indium tin oxide (ITO), indium zinc oxide (IZO), zinc oxide (ZnO), or indium oxide ($In_2O_3$), and the second electrode 23 may be formed of lithium (Li), calcium (Ca), lithium fluoride/calcium (LiF/Ca), lithium fluoride/aluminum (LiF/Al), aluminum (Al), magnesium (Mg), and their combinations.

The organic light-emitting layer 22 located between the first electrode 21 and second electrode 23 may be formed of low molecular or high molecular organic material. If a low molecular organic material is used, a hole injection layer (HIL), a hole transport layer (HTL), an electron transport layer (ETL), and an electron injection layer (EIL) may be stacked in single or complex structure below and over the organic light-emitting layer 22. Various organic materials may be used including copper phthalocyanine (CuPc), N, N'-di(naphthalene-1-yl)-N, N'-diphenyl-benzidine (NPB), and tris-8-hydroxyquinoline aluminum (Alq3). These low molecular organic materials may be formed by using masks in a vacuum deposition method.

If a high molecular organic material is used, the high molecular organic material may have a structure in which an HTL is further located between the organic light-emitting layer 22 and an anode electrode. At this point, Poly(3,4-ethylenedioxythiophene) (PEDOT) may be used as the hole transport layer, and Poly-Phenylenevinylene (PPV)-based and Polyfluorene-based high molecular organic materials may be used as a light-emitting layer.

Figure 6:
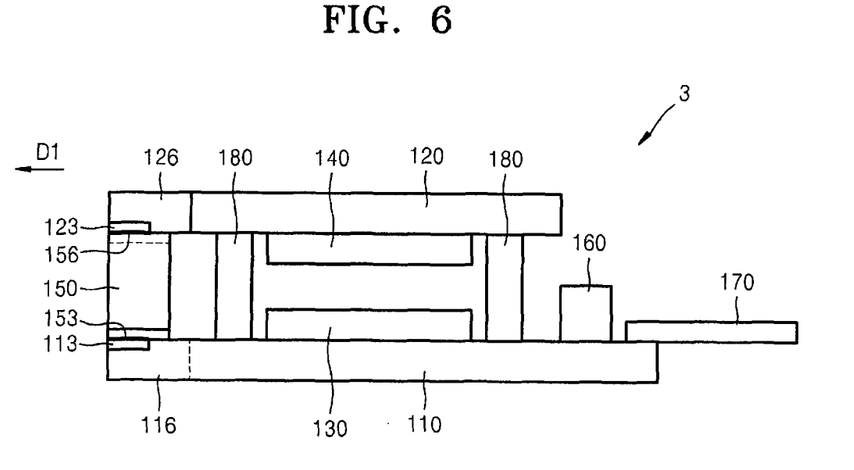
FIG. 6 is a schematic side view of a double-sided emission type display device according to another embodiment of the present invention.
Figure 7:
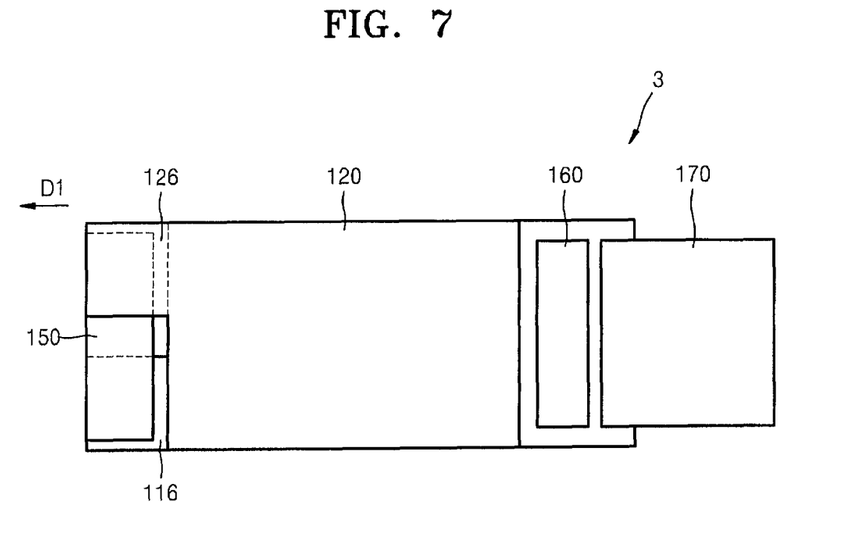
FIG. 7 is a schematic plan view of the double-sided emission type display device of FIG. 6.
Figure 8:
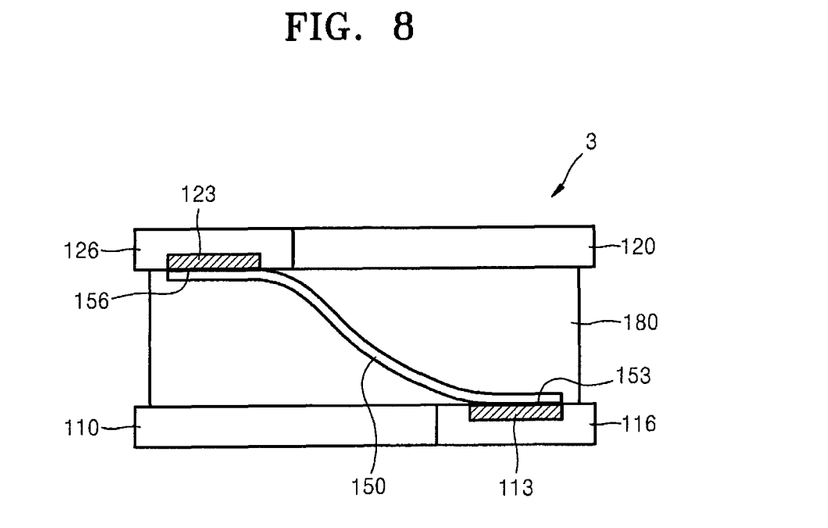
FIG. 8 is a schematic side view of the double-sided emission type display device of FIG. 6.

FIG. 6 is a schematic cross-sectional view of a double-sided emission type display device 3 according to another embodiment of the present invention, FIG. 7 is a schematic plan view of the double-sided emission type display device 3 of FIG. 6, and FIG. 8 is a schematic cross-sectional view of the double-sided emission type display device 3 of FIG. 6. In addition, FIG. 9 is a front view schematically illustrating a space formed between a first substrate 110 and a second substrate 120 in the double-sided emission type display device 3 of FIG. 6.

The present embodiment is described below in terms of its difference from the embodiment of FIG. 1 described previously.

Referring to FIGS. 6 to 8, the double-sided emission type display device 3 may include a first substrate 110, a first display unit 130, a second substrate 120, a second display unit 140, a driving integrated circuit 160, a second FPCB 170, a sealant 180, and a first FPCB 150.

Figure 9:
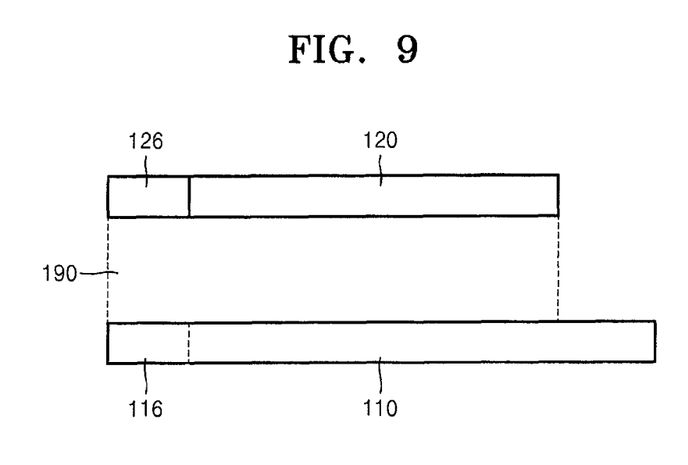
FIG. 9 is a schematic side view of a space formed between a first substrate and a second substrate in the double-sided emission type display device of FIG. 6.

Referring to FIG. 9, a space 190 is formed between the first substrate and the second substrate 120.

In this embodiment, the first FPCB 150 is located in the space 190 formed between the first substrate 110 and the second substrate 120 so that the first FPCB 150 is not exposed to the outside of the first substrate 110 and the second substrate 120. As a result, the appearance of the display device may look neat and the reliability of the instrument or device may be enhanced.

Figure 10:
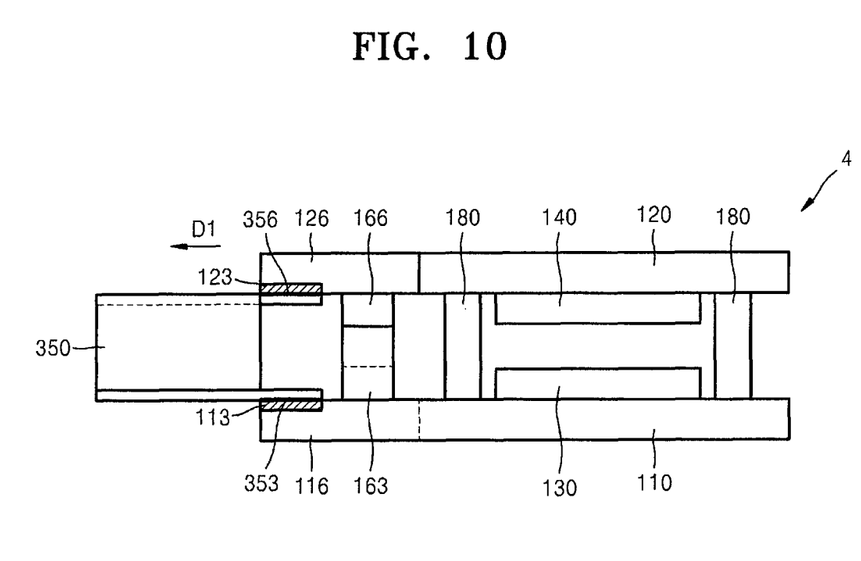
FIG. 10 is a schematic side view of a double-sided emission type display device according to another embodiment of the present invention.
Figure 11:
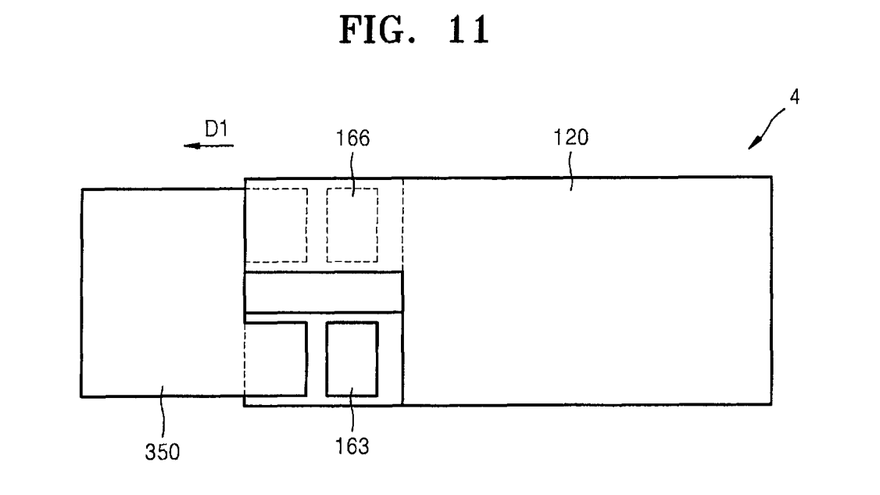
FIG. 11 is a schematic plan view of the double-sided emission type display device of FIG. 10.
Figure 12:
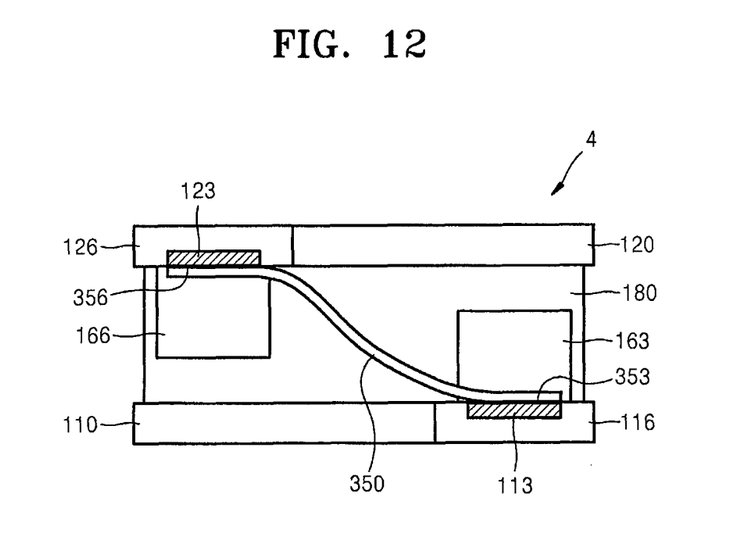
FIG. 12 is a schematic side view of the double-sided emission type display device of FIG. 10.

FIG. 10 is a schematic cross-sectional view of a double-sided emission type display device 4 according to another embodiment of the present invention, FIG. 11 is a schematic plan view of the double-sided emission type display device 4 of FIG. 10, and FIG. 12 is a schematic cross-sectional view of the double-sided emission type display device 4 of FIG. 10.

The present embodiment is described below in terms of its difference from the embodiment of FIG. 1 described previously.

Referring to FIGS. 10 to 12, the double-sided emission type display device 4 may include a first substrate 110, a first display unit 130, a second substrate 120, a second display unit 140, a driving integrated circuit 163, a second driving integrated circuit 166, a sealant 180, and a third FPCB 350.

The third FPCB 350 may be arranged between the first substrate 110 and the second substrate 120. The third flexible printed circuit board 350 receives driving signals from an external driving circuit (not illustrated). To this end, the third FPCB 350 may have a connector (not illustrated). The connector may be integrated/fixed to another connector attached to the external driving circuit, for example, a driving circuit of a mobile phone, and may receive driving signals from the driving circuit of the mobile phone. The third FPCB 250 that receives driving signals creates various control signals in response to the driving signals it receives and correspondingly is configured to drive the first display unit 130, the second display unit 140, or the first driving integrated circuit 163 or the second driving integrated circuit 166. The third FPCB 350 may be a film type FPCB.

The first driving integrated circuit 163 may be located at one side of the first protruded portion 116 toward the second substrate 120 and the second driving integrated circuit 166 may be located at one side of the second protruded portion 126 toward the first substrate 110.

Comparing the embodiment of FIG. 1 described previously, the third FPCB 350 may function as the second FPCB 170 (see FIG. 1). Accordingly, there is no need to separately form the second FPCB 170 (see FIG. 1); therefore the structure becomes simpler. In addition, because the first driving integrated circuit 163 and the second driving integrated circuit 166 may be respectively located at the first substrate 110 and the second substrate 120, the first driving integrated circuit 163 and the second driving integrated circuit 166 may be independently driven. Thus, the images reproduced at the first substrate 110 by the light emitted from the first display unit 130 may depend on those reproduced at the second substrate 120 by the light emitted from the second display unit 140.

The third FPCB 350 may include a first connecting portion 353 that is electrically coupled to a first connection 113 and a second connecting portion 356 that is electrically coupled to a second connection 123. The first connecting portion 353 may be formed at one side of the third FPCB 350, and the second connecting portion 356 may be formed at the other side of the third FPCB 350. Accordingly, the third FPCB 350 may be electrically coupled to the first connection 113 and the second connection 123 without a bent portion. As a result, the incidence of film lead cracks within the third FPCB 350 is reduced or prevented, which increases the reliability of the display device.

In addition, in order to couple the first connection 113 to the first connecting portion 353 or couple the second connection 123 to the second connecting portion 356, heat or pressure may be applied to the connected sides, which may include using a separate instrument or device to facilitate applying heat or pressure to the connected sides. In this embodiment, because the first protruded portion 116 and the second protruded portion 126 may not overlap each other in a direction perpendicular to a plane of the second substrate 120, the instrument or device that may apply heat or pressure may be easily located at the first protruded portion 116 or the second protruded portion 126. Thus, it is relatively easy to connect the first connection 113 to the first connecting portion 353 or attach the second connection 123 to the second connecting portion 356.

The embodiments described according to the present invention may prevent or reduce the incidence of film lead cracks occurring within an FPCB, because the FPCB is connected to facing substrates without a bent portion.

Additionally, because protruded portions are located at the substrates arranged to face each other; it may be easier for the FPCB to attach to the substrates.

Further, a driving integrated circuit or a FPCB driving a display unit is connected to the opposing substrates, which are arranged to face each other; therefore the present invention may have a simple structure and at the same time prevent or reduce incidences of the FPCB from having film lead cracks.

While the present invention has been described with reference to the embodiments illustrated in the drawings, it will be understood by those of ordinary skill in the art that various changes in form and details may be made therein without departing from the spirit and scope of the present invention as defined by the following claims, and their equivalents.

What is claimed is:

1. A double-sided emission type display device comprising:
   a first substrate comprising a first connection and a first protruded portion extending in a first direction;
   a first display unit at the first substrate;
   a second substrate coupled to the first substrate, and comprising a second connection and a second protruded portion extending in the first direction;
   a second display unit at the second substrate; and
   a first flexible printed circuit board having a first edge and a second edge opposite the first edge, and comprising a first connecting portion coupled to the first connection and a second connecting portion coupled to the second connection, both the first connecting portion and the second connecting portion being at the first edge of the first flexible printed circuit board.

2. The display device of claim 1, wherein the first display unit is at a side of the first substrate facing the second substrate, and the second display unit is at a side of the second substrate facing the first substrate.

3. The display device of claim 2, wherein a first image is reproduced at the first substrate by light emitted from the first display unit, and a second image is reproduced at the second substrate by light emitted from the second display unit.

4. The display device of claim 3, wherein the first substrate and the second substrate are transparent.

5. The display device of claim 1, further comprising:
   a driving integrated circuit; and
   a second flexible printed circuit board configured to drive the driving integrated circuit, the first display unit, or the second display unit.

6. The display device of claim 5, wherein the driving integrated circuit and the second flexible printed circuit board are both at the first substrate or the second substrate.

7. The display device of claim 5, wherein the first flexible printed circuit board and the second flexible printed circuit board are of a film type.

8. The display device of claim 1, wherein the first protruded portion and the second protruded portion do not overlap each other in a second direction perpendicular to a plane of the second substrate.

9. The display device of claim 8, wherein the first connection is at a side of the first protruded portion facing the second substrate, and the second connection is at a side of the second protruded portion facing the first substrate.

10. The display device of claim 1, wherein the first connecting portion is at a first side of the first flexible printed circuit board and the second connecting portion is at a second side of the first flexible printed circuit board opposite the first side.

11. The display device of claim 1, wherein the first flexible printed circuit board is at a space between the first substrate and the second substrate.

12. The display device of claim 1, wherein the first display unit and the second display unit comprise an organic light-emitting element.

13. A double-sided emission type display device comprising:
   a first substrate comprising a first connection;
   a first display unit at the first substrate;
   a second substrate coupled to the first substrate and comprising a second connection;
   a second display unit at the second substrate;
   a first driving integrated circuit at the first substrate;
   a second driving integrated circuit at the second substrate; and
   a third flexible printed circuit board configured to drive the first driving integrated circuit, the second driving integrated circuit, the first display unit, or the second display unit, wherein the third flexible printed circuit board has a first edge and a second edge opposite the first edge, and comprises a first connecting portion at one side of the third flexible printed circuit board and coupled to the first connection and a second connecting portion at the other side of the third flexible printed circuit board and coupled to the second connection,
   wherein both the first connecting portion and the second connecting portion are at the first edge of the third flexible printed circuit board.

14. The display device of claim 13, wherein the first display unit is at a side of the first substrate facing the second substrate, and the second display unit is at a side of the second substrate facing the first substrate.

15. The display device of claim 14, wherein a first image is reproduced at the first substrate by light emitted from the first display unit, and a second image is reproduced at the second substrate by the light emitted from the second display unit.

16. The display device of claim 15, wherein the first substrate and the second substrate are transparent.

17. The display device of claim 13, wherein the first substrate comprises a first protruded portion at one end of the first substrate and extending in a first direction, and the second substrate comprises a second protruded portion at one end of the second substrate and extending in the first direction, wherein the first and second protruded portions do not overlap each other in a second direction perpendicular to a plane of the second substrate.

18. The display device of claim 17, wherein the first connection is at a side of the first protruded portion facing the second substrate, and the second connection is at a side of the second protruded portion facing the first substrate.

19. The display device of claim 18, wherein the first driving integrated circuit is at the side of the first protruded portion facing the second substrate, and the second driving integrated circuit is at the side of the second protruded portion facing the first substrate.

20. The display device of claim 13, wherein the third flexible printed circuit board is a film type.

21. The display device of claim 13, wherein the first display unit and the second display unit each comprise an organic light-emitting element.

* * * * *